(12) United States Patent
Grischenko et al.

(10) Patent No.: US 11,992,101 B2
(45) Date of Patent: May 28, 2024

(54) NUCLEATED POLYPROPYLENE RESIN FOR PRIMARY LENS PACKAGE

(71) Applicant: Johnson & Johnson Vision Care, Inc., Jacksonville, FL (US)

(72) Inventors: Oleg Grischenko, Jacksonville, FL (US); Billy Boddiford, White Oak, TX (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 898 days.

(21) Appl. No.: 16/944,204

(22) Filed: Jul. 31, 2020

(65) Prior Publication Data

US 2022/0031033 A1 Feb. 3, 2022

(51) Int. Cl.
| | |
|---|---|
| *A45C 11/00* | (2006.01) |
| *C08K 3/26* | (2006.01) |
| *C08K 5/092* | (2006.01) |
| *C08K 5/3492* | (2006.01) |
| *C08K 5/52* | (2006.01) |
| *C08L 23/12* | (2006.01) |

(52) U.S. Cl.
CPC .............. *A45C 11/005* (2013.01); *C08K 3/26* (2013.01); *C08K 5/092* (2013.01); *C08K 5/34924* (2013.01); *C08K 5/52* (2013.01); *C08L 23/12* (2013.01); *C08K 2003/267* (2013.01); *C08L 2201/08* (2013.01); *C08L 2205/24* (2013.01)

(58) Field of Classification Search
CPC ...... C08K 3/26; C08K 5/092; C08K 5/34924; C08K 5/52; C08K 2003/267; C08L 23/12; C08L 2201/08; C08L 2205/24
See application file for complete search history.

(56) References Cited

U.S. PATENT DOCUMENTS

| 4,691,820 | A | | 9/1987 | Martinez |
| 5,006,587 | A | * | 4/1991 | Fielding ................... C08K 3/38 |
| | | | | 524/102 |
| 5,054,610 | A | | 10/1991 | Ajello |
| | | | (Continued) | |

FOREIGN PATENT DOCUMENTS

| EP | 0316187 | 2/1994 |
| EP | 1900503 | 9/2019 |
| | (Continued) | |

OTHER PUBLICATIONS

Database CA [Online] Chemical Abstracts Service, Columbus, Ohio, US; Jun. 19, 2020 (Jun. 19, 2020), Fang, He et al: "Preparation method of medium-high melt index warp-resistant polypropylene material", XP002804953, retrieved from STN Database accession No. 2020:11 84756; -& CN 111 303 319 A (Yunnan Yuntianhua Petrochemical Co Ltd) Jun. 19, 2020 (Jun. 19, 2020).

(Continued)

*Primary Examiner* — Michael C Miggins

(57) ABSTRACT

A primary package for holding contact lenses is disclosed. It is primarily made from a nucleated polypropylene resin. It has been determined that the nucleated polypropylene resin should be formulated with a polypropylene base resin with greater than 99% polypropylene homopolymer and a primary and secondary stabilizer, which also contains a catalyst acid scavenger; at least one nucleator/clarifier; and at least one catalyst acid scavenger.

8 Claims, 2 Drawing Sheets

(56) References Cited

U.S. PATENT DOCUMENTS

| | | |
|---|---|---|
| 5,337,888 A | 8/1994 | Morrison |
| 5,375,698 A | 12/1994 | Ewart et al. |
| 5,409,104 A | 4/1995 | Lovell |
| 5,467,868 A | 11/1995 | Abrams et al. |
| 5,515,964 A | 5/1996 | Bauman |
| 5,573,108 A | 11/1996 | Hamilton et al. |
| 5,609,246 A | 3/1997 | Borghorst et al. |
| 5,695,049 A | 12/1997 | Bauman |
| 5,697,495 A | 12/1997 | Abrams et al. |
| 5,704,468 A | 1/1998 | Lust et al. |
| 5,711,416 A | 1/1998 | Bauman |
| 5,722,536 A | 3/1998 | Pierce et al. |
| 5,823,327 A | 10/1998 | Wu et al. |
| 5,983,608 A | 11/1999 | Wu et al. |
| 6,029,808 A | 2/2000 | Peck et al. |
| 6,044,966 A | 4/2000 | Haase |
| D458,023 S | 6/2002 | Dzwill et al. |
| 6,401,915 B1 | 6/2002 | Faxe |
| 10,618,257 B2 | 4/2020 | Suzuki et al. |
| 2016/0145412 A1 | 5/2016 | Lake, Jr. |
| 2020/0231792 A1 | 7/2020 | Alvarez |

FOREIGN PATENT DOCUMENTS

| | | |
|---|---|---|
| IN | 20150176713 | * 11/2016 |
| WO | WO 9924479 | 5/1999 |
| WO | WO 2002044260 | 6/2002 |

OTHER PUBLICATIONS

Hans Zweifel, "Plastic Additives Handbook", 6th edition, pp. 1141-1190, 2009.

\* cited by examiner

NUCLEATED POLYPROPYLENE RESIN FOR PRIMARY LENS PACKAGE

BACKGROUND OF THE INVENTION

The present invention relates to a nucleated polypropylene formulation which is developed for use as a primary package for storing contact lenses.

It is desired to create a "primary" package, i.e., the package which holds a contact lens, to have several significant properties. First, it must be easy to manufacture and store. Second, it should have optical clarity, that is, the wearer of the lens should be readily able to see the lens as it is held in the package. Third, it should be relatively impermeable to absorbing the solution in which the lens is held. This will allow the lens to be maintained in the correct chemical solution. This is useful when the lens and solution hold a drug for use on the eye. Then, so long as the package is relatively impermeable, the user can confidently know that the proper amount of solution continues to be contained in the lens itself.

SUMMARY OF THE INVENTION

A novel primary package for holding contact lenses is disclosed. It is primarily made from a nucleated polypropylene resin. It has been determined that the nucleated polypropylene resin should be formulated with: a polypropylene base resin consisting of >99% polypropylene homopolymer with a primary and a secondary stabilizer, which also contains an acid scavenger; and at least one nucleator/clarifier.

Certain unique attributes are apparent in the package created due to its unique formulation. First the formulation has a controlled shrinkage which is engineered to match the shrinkage of non-nucleated polypropylenes, in both the crossflow and in-flow directions. All the while, the polypropylene resin should maintain an elevated temperature of crystallization. A particularly challenging aspect for non-nucleated materials is the lower temperature of crystallization, which results in longer injection molding cycle times and lower machine productivity. This resultant high crystallization temperature allows shortened cooling cycle in the injection molding process, and thus shortened overall injection molding cycle time.

Second, the above-mentioned resin formulation should yield stiffer parts and improved optical clarity when compared to the parts made from a non-nucleated resin. The benefits of optical clarity into the package is rather self-explanatory.

Third, the material should have the benefit of a low migration rate of additives from polypropylene into packaging solution, resulting in reduced leaching of any plastic constituents into the packaging solution and the contact lens, which is naturally, a rather important requirement for a lens primary package.

In one embodiment of the present invention, the concentrations of ingredients were:
 a) base polypropylene resin ≥99%
 b) acid scavenger <0.25%
 c) nucleator agent/clarifier <0.1%

One particularly useful base resin has been found to be 1-propene homopolymer. A useful scavenger is magnesium aluminum hydroxide carbonate hydrate in an amount of about 0.04 wt %. The clarifier or nucleating agent was chosen as 1,2-cyclohexane dicarboxylic acid, calcium salt (1:1), (1R, 2S)-rel-in an amount of about 0.05 wt %.

Several nucleating additives were evaluated, and in one embodiment a calcium salt compound was used. At a concentration range of nucleating agent (calcium salt) of 0.02 to 0.10 wt %, the resin formulation demonstrated temperature of crystallization in the range from 125° C. to 135° C., which is in an ideal range for an injection molding process with a relatively fast cycle, of generally less than three seconds.

Antioxidants (also referred to as stabilizers) may also be included in the formulation, to prevent resin degradation over time. From among the antioxidants or stabilizers analyzed, two particularly useful antioxidants were tris(3,5-di-butyl-4-hydroxylbenzyl) isocyanurate as a primary antioxidant in an amount of about 0.05 wt %, and tris-(2,4-di-t-butylphenyl) phosphite as a secondary antioxidant in an amount of about 0.10 wt %.

DETAILED DESCRIPTION OF INVENTION

Figure 1:
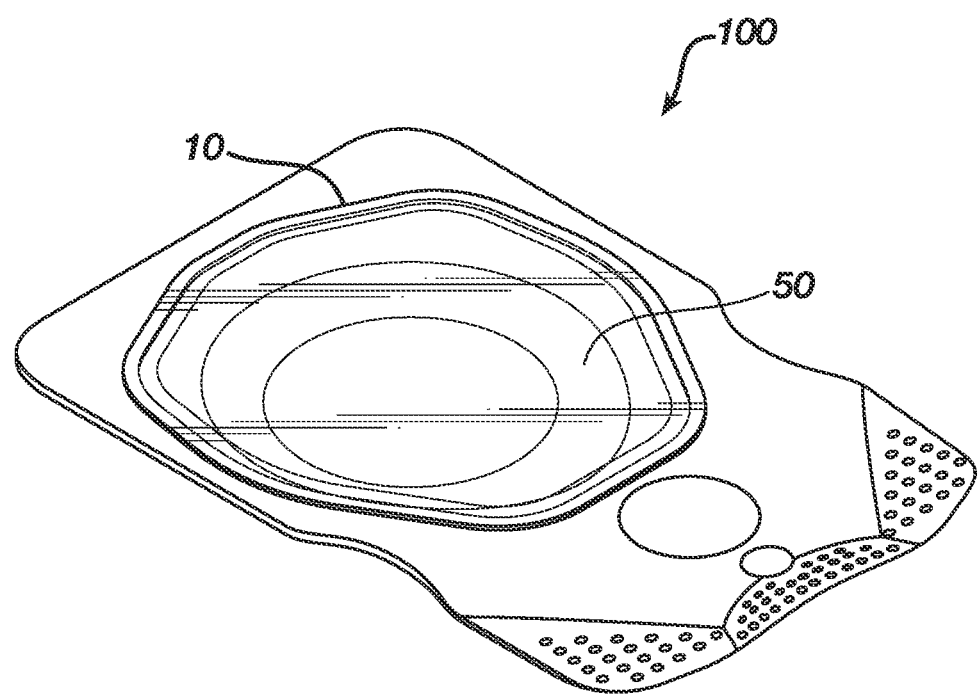
FIG. 1 is a perspective view of a package made using the formulation of the present invention.

FIG. 1 describes a typical contact lens package 100 made using the present invention. It contains a "bulb," or base 50, which holds a lens (not shown) in solution. A film or cover 10 is placed over the lens in solution.

The term "base" refers to any receptacle for medical devices, where the size and shape of the base are determined by the device and other considerations known those who are skilled in the art of making or designing molded bases. For example, molded bases may be individual blister packages, including contact lens blister packages; secondary packages; or hydrating trays. The molded base 50 may be prepared from any number of materials provided that those materials are compatible with the chemical and physical properties of the device. With respect to the shape of the molded base, examples of suitably shaped bases are disclosed in the following patents which are hereby incorporated by reference in their entirety, U.S. Pat. Nos. D 458,023; 4,691,820; 5,054,610; 5,337,888; 5,375,698; 5,409,104; 5,467,868; 5,515,964; 5,609,246; 5,695,049; 5,697,495; 5,704,468; 5,711,416; 5,722,536; 5,573,108; 5,823,327; 5,704,468; 5,983,608; 6,029,808; 6,044,966; and 6,401,915.

As in the cited references, the molded based 50 is sealed about the cavity that encloses the contact lens. Flexible film cover sheets 10 can be made from can be an adhesive laminate of an aluminum foil and a polypropylene film or any other extruded or co-extruded film that can be sealed to the top surface of the flange in order to form a hermetic seal for the medical device and the solution. Further, the base can be formed by any of several known methods which include but are not limited to injection molding, transfer molding, skin packaging, blow molding, coinjection molding, film extrusion, or film co-extrusion.

A "homopolymer" is a polymer made from one monomer. Polypropylene homopolymer is polymer formed polypropylene as the only monomer, but may include additives which do not form part of the polymeric chain. The following are examples of suitable polypropylene homopolymer resin grades (Flint Hills Resources) which were evaluated for manufacturing of lens primary packages:
 P4C5N-046 (homopolymer)
 11T55V (clarified homopolymer)

P4C6B-134A (homopolymer)
P4C6S-193A (clarified homopolymer)
P4C6N-041 (homopolymer)
P4C6Z-059 (homopolymer)
P4C6Z-022 (homopolymer)
P4C6B-194(nucleated homopolymer)

Preferred examples of the alpha nucleating agents according to the preferred configuration included:
- sodium-2,2'-methylene-bis(4,6-di-t-butylphenyl)phosphate,
- sodium-2,2'-ethylidene-bis(4,6-di-t-butylphenyl)phosphate,
- lithium-2,2'-methylene-bis(4,6-di-t-butylphenyl)phosphate,
- lithium-2,2'-ethylidene-bis(4,6-di-t-butylphenyl)phosphate,
- sodium-2,2'-ethylidene-bis(4-1-propyl-6-t-butylphenyl) phosphate,
- lithium-2,2'-methylene-bis(4-methyl-6-t-butylphenyl) phosphate,
- lithium-2,2'-methylene-bis(4-ethyl-6-t-butylphenyl)phosphate,
- calcium-bis[2,2'-thiobis(4-methyl-6-t-butylphenyl)phosphate],
- calcium-bis[2,2'-thiobis(4-ethyl-6-t-butylphenyl)phosphate],
- calcium-bis[2,2'-thiobis(4,6-di-t-butylphenyl)phosphate],
- magnesium-bis[2,2'-thiobis(4,6-di-t-butylphenyl)phosphate],
- magnesium-bis[2,2'-thiobis(4-t-octylphenyl)phosphate],
- sodium-2,2'-butylidene-bis(4,6-dimethylphenyl)phosphate,
- sodium-2,2'-butylidene-bis(4,6-di-t-butylphenyl)phosphate,
- sodium-2,2'-t-octylmethylene-bis(4,6-dimethylphenyl) phosphate,
- sodium-2,2'-t-octylmethylene-bis(4,6-di-t-butylphenyl) phosphate,
- calcium-bis[2,2'-methylene-bis(4,6-di-t-butylphenyl) phosphate],
- magnesium-bis[2,2'-methylene-bis(4,6-di-t-butylphenyl) phosphate],
- barium-bis[2,2'-methylene-bis(4,6-di-t-butylphenyl) phosphate],
- sodium-2,2'-methylene-bis(4-methyl-6-t-butylphenyl) phosphate,
- sodium-2,2'-methylene-bis(4-ethyl-6-t-butylphenyl)phosphate,
- sodium(4,4'-dimethyl-5,6'-di-t-butyl-2,2'-biphenyl)phosphate,
- calcium-bis[(4,4'-dimethyl-6,6'-di-t-butyl-2,2'-biphenyl) phosphate],
- sodium-2,2'-ethylidene-bis(4-m-butyl-6-t-butylphenyl) phosphate,
- sodium-2,2'-methylene-bis(4,6-dimethylphenyl)phosphate,
- sodium-2,2'-methylene-bis(4,6-diethylphenyl)phosphate,
- potassium-2,2'-ethylidene-bis(4,6-di-t-butylphenyl)phosphate,
- calcium-bis[2,2'-ethylidene-bis(4,6-di-t-butylphenyl) phosphate],
- magnesium-bis[2,2'-ethylidene-bis(4,6-di-t-butylphenyl) phosphate],
- barium-bis[2,2'-ethylidene-bis(4,6-di-t-butylphenyl) phosphate],
- aluminium-tris[2,2'-ethylidene-bis(4,6-di-t-butylphenyl) phosphate],
- aluminium-hydroxy-bis[2,2'-methylene-bis(4,6-di-t-butyl-phenyl)phosphate].

A second group, phosphorous based nucleating agents includes for example aluminium-hydroxy-bis[2,4,8,10-tetrakis(1,1-dimethylethyl)-6-hydroxy-12H-dibenzo-[d,g]-dioxa-phoshocin-6-oxidato], and blends thereof with Li-myristate or Li-stearate.

Of the phosphorous based nucleating agents sodium-2,2'-methylene-bis(4,6-di-t-butylphenyl)phosphate or aluminium-hydroxy-bis[2,2'-methy-lene-bis(4,6-di-t-butyl-phenyl)-phosphate] or aluminum-hydroxy-bis-[2,4,8,10-tetrakis(1,1-dimethylethyl)-6-hydroxy-12H-dibenzo-[d,g]-dioxa-phoshocin-6-oxidato] or blends thereof with Li-myristate or Li-stearate are especially preferred.

Also sorbitol-based nucleating agents, like optionally substituted dibenzylidine sorbitol (e.g. 1,3:2,4 Dibenzylidene sorbitol, 1,3:2,4 Di(methylbenzylidene) sorbitol, 1,3:2,4 Di(ethylbenzylidene) sorbitol, 1,3:2,4 Bis(3,4-dimethylbenzylidene) sorbitol, etc.) or pine rosin can be used as nucleating agents. Further suitable alpha-nucleating agents are polymeric nucleating agents selected from the group consisting of vinylcycloalkane polymers and vinylalkane polymers. Nucleation with these polymeric nucleating agents is either accomplished by a special reactor technique, where the catalyst is prepolymerised with monomers like e.g. vinylcyclohexane (VCH), or by blending the propylene polymer with the vinyl(cyclo)alkane polymer. These methods are described in greater detail in e.g. EP 0 316 187 A2 and WO 99/24479, the disclosure of which is incorporated herein by reference.

Nucleating agents such as ADK NA-11 (Methylen-bis(4,6-di-t-butylphenyl)phosphate sodium salt) and ADK NA-21 (comprising aluminium hydroxy-bis[2, 4,8,10-tetrakis(1,1-dimethylethyl)-6-hydroxy-12H-dibenzo-[d,g]-dioxa-phoshocin-6-oxidato]) are commercially available from Asahi Denka Kokai and are among those which are preferably added to the polyolefin composition of the invention. Millad 3988 (3,4-Dimethylbenzylidene sorbitol), Millad NX8000, Millad 3905 and Millad 3940 available from Milliken & Company are other examples of nucleating agents that can be utilized in the invention.

Further commercial available alpha-nucleating agents, which can be used for the composition of the invention are, for example, IrgaclearXT 386 (N-[3,5-bis-(2,2-dimethyl-propionylamino)-phenyl]-2,2-dimethylpropionamide) from BASF (formally Ciba Speciality Chemicals), Hyperform HPN-68L and Hyperform HPN-20E from Milliken & Company.

Among all alpha-nucleating agents mentioned above, aluminium hydroxy-bis[2, 4,8, 10-tetrakis(1,1-dimethyl-ethyl)-6-hydroxy-12H-dibenzo-[d,g]-dioxa-phoshocin-6-oxidato]based nucleating agents like ADK NA-21, NA-21E, NA-21 F, etc., sodium-2,2'-methylene-bis(4,6-di-t-butylphenyl)phosphate (ADK NA-11), aluminium-hydroxy-bis[2,2'-methylene-bis(4,6-di-t-butyl-phenyl)-phosphate], sorbitol-based nucleating agents like Millad 3988, Millad 3905 and Millad 3940 and polymeric nucleating agents selected from the group consisting of vinylcycloalkane polymers and vinylalkane polymers are particularly preferred.

According to an embodiment of the present invention, the at least one alpha-nucleating agent is comprised of a polymeric nucleating agent selected from the group consisting of vinylcycloalkane polymers and vinylalkane polymers, preferably poly-vinylcyclohexane (pVCH).

According to a further embodiment the at least one alpha-nucleating agent is selected from the group consisting of aluminium hydroxy-bis[2, 4,8,10-tetrakis(1,1-dimethylethyl)-6-hydroxy-12H-dibenzo-[d,g]-dioxa-phoshocin-6-oxidato] based nucleating agents (e.g. ADK NA-21, NA-21 E, NA-21 F), sodium-2,2'-methylene-bis(4,6-di-t-butylphenyl)phosphate (ADK NA-1 1), aluminium-hydroxy-bis[2,2'-methylene-bis(4,6-di-t-butyl-phenyl)-phosphate] and sorbitol-based nucleating agents (e.g. Millad NX8000, Millad 3988, Millad 3905 and Millad 3940).

For the embodiment where the at least one alpha-nucleating agent is selected from the group—and consists of vinylcycloalkane polymers and vinylalkane polymers, preferably poly-vinylcyclohexane (pVCH).

Additives are preferably present in the polymer composition and can be partly or fully be present when added to the polymer composition during the preparation there of.

Additives are suitably selected from the group of primary antioxidants like sterically hindered phenols and secondary antioxidants like phosphites, UV stabilizers like sterically hindered amines, acid scavengers, carbon black, pigment, antistatic agents like glycerol monostearate, slip agents like oleamide, Erucamide, plasticizers, anti-scratch agents, dispersing agents, processing aids, lubricants, and the like.

Additives are commercially available and for example described in "Plastic Additives Handbook", 6th edition 2009 of Hans Zweifel (pages 1141 to 1190) and typically used in conventional amounts. It is assumed that someone versed in the art will be familiar and had experience using these products.

Package 100 is formed from a novel nucleated resin formulation which has been developed to aid in the manufacture of the primary package (base 50). Resin formulation was engineered using polypropylene material and additive package. The key characteristics of the formulated resin are:
  an ability to run faster injection molding cycle times,
  improved manufacturing process runnability,
  reduced haze of the blister (better clarity),
  part shrinkage corresponding at least to that of a non-nucleated resin,
  low leaching (extractable) levels,
  ability to use generally current package molds for manufacturing.
  ability to shorten injection molding cycle time without adding costly mold chillers for cooling the molds.

Some of the embodiments were formulated with optional components may include UV blockers, UV reflectors and color dyes.

A nucleated polypropylene resin for manufacturing the lens primary package (blister 50) was formulated with:
  a polypropylene base resin consisting of >99% polypropylene homopolymer with a primary and a secondary stabilizer which also contains or functions as an acid scavenger; and
  at least one nucleator/clarifier.

In one particularly preferred embodiment the concentrations of ingredients were:
  base polypropylene resin ≥99%
  acid scavenger <0.25%
  nucleator agent/clarifier <0.1%

For a contact lens package 100, the formulated nucleated resin may have observed physical properties within the following specified ranges:
  Melt Flow Rate range ranging from 20 to 40 g/10 min when measured according to ASTM D 1238
  Density of about 0.90 g/cm3 when measured according to ASTM D 1505
  Melting Temperature Range from 130° C. to 165° C. when measured according to ASTM D 3418
  Deflection Temperature @ 66 psi (0.455 MPa) ranging from at least 105° C. to 120° C. when measured according to ASTM D 648
  Major Heat of Fusion (J/g) range from 90 to 105 when measured according to ASTM D 34181

Examples 1-4

The inventors manufactured plastic plaques and packages in thickness ranges from 0.5 to 1.0 mm which are common ranges for contact lens packages. Typical injection molding parameters are listed in Table 1. It is to be understood that the parameters can be varied depending on the size and desired characteristics of the package, such as sturdiness, length of use, need for flexibility, etc.

TABLE 1

Injection molding parameters

| Parameter | Minimum | Normal | Maximum |
|---|---|---|---|
| Injection Speed (ccm/s) | 50 | 60 | 70 |
| Switch-Over Point (ccm) | 5.1 | 5.1 | 5.1 |
| Dosage Volume (ccm) | 14.5 | 14.8 | 15.0 |
| Hold Pressure Point 1 (bar) | 800 | 950 | 1000 |
| Hold Pressure Point 2 (bar) | 800 | 950 | 1000 |
| Hold Pressure Point 3 (bar) | 100 | 100 | 100 |
| Hold Pressure Ramp (sec) | .05 | .05 | .05 |
| Hold Pressure Time (sec) | 0.45 | 0.50 | 0.50 |
| Hold Pressure Time (sec) | .03 | .03 | .03 |
| Cooling Time (sec) | 1.7 | 1.7 | 1.8 |
| Hot Runner Temp 1 (° C.) | 240 | 245 | 250 |

Inflow and crossflow shrinkage of test materials were measured for each formulation, including shrinkage of the material using customary measuring techniques. Shrinkage was measured using 4"x4" plastic plates with ⅛" thickness. Size was measured upon completion of molding, and again after 40 hours. The difference observed was the amount of shrinkage.

The nucleated polypropylene is chosen using a base resin. One particularly useful base resin was found to be 1-propene homopolymer. The base resin was used for each of the following embodiments, each of which were tested for their performance properties.

TABLE 2

Tested additives packages

| | | Concentration (ppm) | | | |
|---|---|---|---|---|---|
| Additive | Units | Ex. 1 | Ex. 2 | Ex. 3 | Ex. 4 |
| 1,3,5 Tris(3,5-di-tert-butyl-4-hydroxy-benzyl)-1,3,5 triazine-2,4,6(1H,3H,5H)trione | ppm | 500 | 500 | 500 | 500 |
| Tris(2,4-di-t-butyl-phenyl) Phosphite | ppm | 1000 | 1000 | 1000 | 1000 |
| Magnesium aluminum hydroxycarbonate | ppm | 300 | 300 | 300 | 300 |
| Bicyclo[2.2.1]heptane-2,3-dicarboxylicacid, sodium salt (1:2) | ppm | | | | 500 |
| Calcium cis-1,2-cyclohexanedicarboxylate | ppm | | | 500 | |
| 1,3,5-Tris(2,2-Dimethylopanamido) Benzene | ppm | | 180 | | |

Thereafter as seen in Table 3, we compared the mechanical properties and the injection molding properties of certain non-nucleated resins with three embodiments of the nucleated resin formulations.

TABLE 3

Mechanical and injection molding properties of several resin formulations

| TESTS | Cond/Speed | ASTM Method | Units | Non-nucleated PP | PP resin w additive pk Ex1 | PP resin w additive pk Ex2 | PP resin w additive pk Ex3 | PP resin w additive pk Ex4 |
|---|---|---|---|---|---|---|---|---|
| Melt Flow | 230/2.16 | D 1238 Proc B | g/10 min | 29 | 17 | 32 | 33 | 33 |
| Tensile Stress @ yield (zero slope) | 50 mm/min | D 638 | Mpa | 33.5 | 32.8 | 33.2 | 39.3 | 32.3 |
| Tensile Stress @ yield (zero slope) | 50 mm/min | D 638 | psi | 4860 | 4760 | 4810 | 5700 | 4680 |
| Tensile Strain @ yield (zero slope) | 50 mm/min | D 638 | % | 7.11 | 9.27 | 8.78 | 6.03 | 8.67 |
| Flexural Modulus(Tangent) | 1.3 mm/min | D 790 Proc A | Mpa | 1450 | 1490 | 1490 | 2020 | 1460 |
| Flexural Modulus(Tangent) | 1.3 mm/min | D 790 Proc A | psi | 210000 | 216000 | 216000 | 292000 | 212000 |
| Flexural Modulus(Secant 1%) | 1.3 mm/min | D 790 Proc A | Mpa | 1320 | 1320 | 1340 | 1830 | 1300 |
| Flexural Modulus(Secant 1%) | 1.3 mm/min | D 790 Proc A | psi | 192000 | 192000 | 194000 | 266000 | 189000 |
| Notched Izod @23° C. | 23° C. | D 256 Md A | J/m | 29.1 | 41.1 | 33.9 | 32.8 | 34.8 |
| Notched Izod @23° C. | 23° C. | D 256 Md A | ft-lb/in | 0.546 | 0.769 | 0.635 | 0.613 | 0.653 |
| Gardner Impact at 23° C. | GB (0.625/1.25) | D 5420 | J | 27 | 20.1 | 27.4 | 31.7 | 30.4 |
| Gardner Impact @ 23° C. | GB (0.625/1.25) | D 5420 | in-lb | 239 | 178 | 243 | 280 | 269 |
| HDT @ 66 PSI (0.455 Mpa) | 2° C./min | D 648 | ° C. | 103 | 89 | 99 | 120 | 98 |
| Rockwell Hardness | | D 785 | R | 100 | 92 | 96 | 97 | 96 |
| % Haze (29.5 mil plaque) | 29.5 mil | D 1003 | % | 46.9 | 50.6 | 12.8 | 32 | 46.1 |

As seen in Table 4, the concentration of additives is optimized for the injection molding process and the part shrinkage rate, the shrinkage rate has been closely matched to that of a non-nucleated material.

Figure 2:
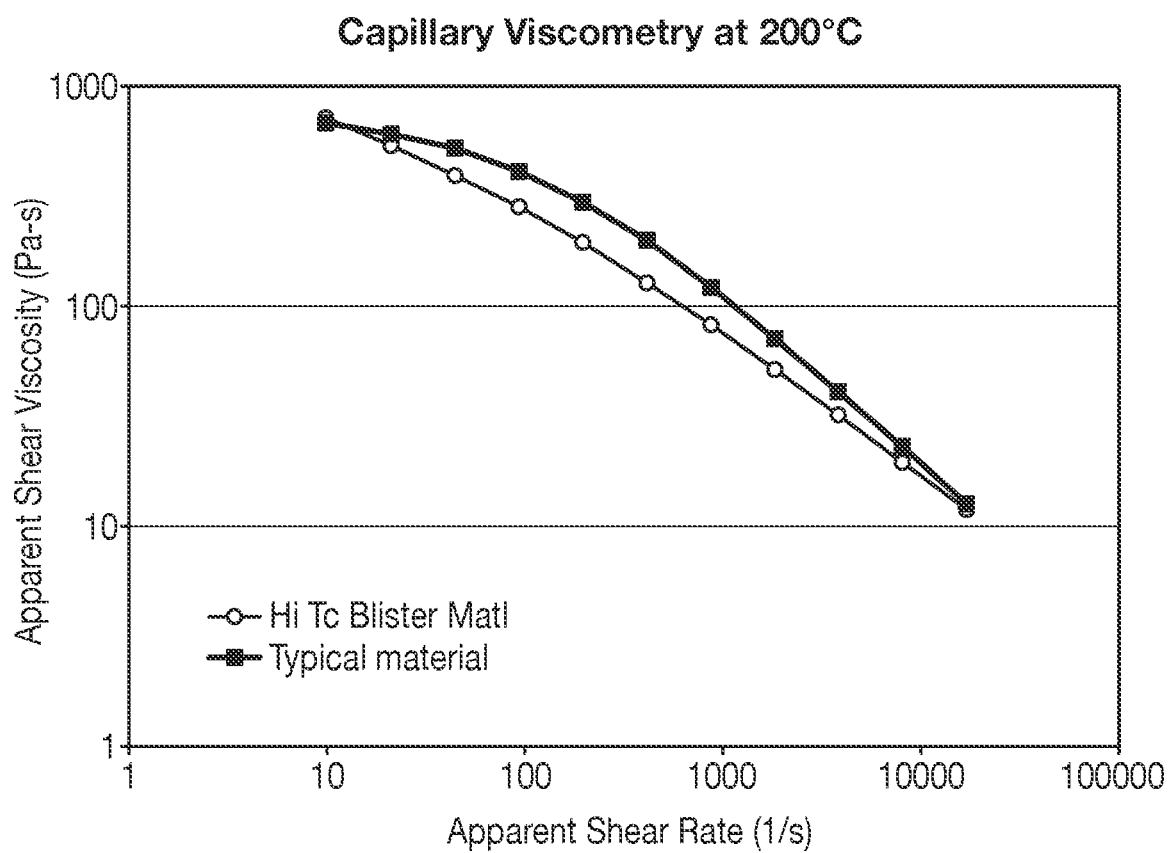
FIG. 2 is a graph showing rheology profiles using the formulation of the present invention.

The above described resin formulation produced rheology profile depicted in the graph of FIG. 2. In the graph, the nucleated resin identified as "Hi Tc Blister Matl" and non-nucleated as "typical material". The nucleated material

TABLE 4

Thermodynamic properties of tested resin grades

| Tests & Measurements | | | Non-nucleated PP | PP resin w additive pk Ex1 | PP resin w additive pk Ex1 | PP resin w additive pk Ex1 | PP resin w additive pk Ex1 |
|---|---|---|---|---|---|---|---|
| Average Shrinkage | D 995 | % | 1.3073 | 1.4979 | 1.662 | 1.257 | 1.7029 |
| Major Melting Point, Tm1 | D 3418 | ° C. | 152.4 | 160.8 | 162.9 | 164.5 | 163.8 |
| Major Heat of Fusion DHf | D 3418 | J/g | 85.9 | 92.1 | 92.3 | 103.9 | 92.8 |
| Major Crystallization Temp. Tc1 | D 3418 | ° C. | 116.7 | 120.1 | 128 | 130.1 | 130.4 |
| Major Heat of Crystallization DHc | D 3418 | J/g | −90.3 | −93.8 | −94 | −104.1 | −95.5 | shows a higher sensitivity to shear which aids in filling and packing the cavity of the mold when making the part. The higher shear and Tc allows for faster mold filling and cooling at a lower pressure.

From these tests and experiments we can draw the following conclusions:

The nucleation packages in combination with selected polypropylene molecular weight distribution will yield material with well-controlled shrinkage properties, The nucleated resin has a shrinkage rate similar to the shrinkage rate of non-nucleated resins. The primary packages made from nucleated polypropylene described above compared favorably with packages constructed from non-nucleated polypropylene.

The primary package can be manufactured faster, at significantly shorter injection molding cycle time and without impacting part dimensions. No alteration of any kind is required to the mold or the mold cavities for making the package using a nucleated resin. For example, when operating a Nestal E-Jet 500 injection molding machine with Universal Pack 8 cavity mold, the injection cycle was shortened from 2.70 sec to 2.15 sec, with the introduction of a nucleated polypropylene resin grade (P4H6N-222.) This shorter cycle time was repeatedly and sustainably maintained for many hours without any process issues. In other shorter trials on the same injection molding equipment cycle times of as low as 1.9 seconds were achieved. No alteration of injection molding of equipment was performed, the acceleration of process was achieved solely by changing the polypropylene resin.

Given its properties, the nucleated polypropylene formulation as described herein enables on-demand part production. Normally when using non-nucleated polypropylene, an injection molding machine (IMM) is left running even when the lens production is paused or stopped. During this time the blisters are continuously made and either discarded or recycled. This is done since if the IMM is operating using a non-nucleated polypropylene is then stopped, it cannot resume its production immediately. The line must be purged and run idle in order to achieve a steady state of production. This process can take 15 minutes or longer, but must be done, as failure to condition IMM to a steady state will result in warped and out-of-spec parts.

No such limitation exists when using a nucleated polypropylene. With such a resin, IMM can stop and start instantly without issue—due to absence of part warpage. Also, it is possible to speed up and slow down the rate of production of the primary package to meet requirements of lens production at any given time. This property gives the user the ability to produce "on-demand production" of the primary package, and addresses polypropylene waste reduction, especially in a 24/7 production environment.

Of course, it is to be understood that while the present invention is described for use with contact lenses, it is perfectly adaptable to be used for any package which makes use of such a nucleated polypropylene. For instance, the technology is adaptable for use with any molded base. These and other objects of the invention will be better understood from the appended claims and their equivalents.

What is claimed is:

1. In combination:
a contact lens package comprising:
a nucleated polypropylene resin formed from a polypropylene base resin consisting of a polypropylene homopolymer, a primary stabilizer comprising tris(3,5-di-butyl-4-hydroxylbenzyl) isocyanurate, and a secondary stabilizer comprising tris-(2,4-di-t-butylphenyl) phosphite;
at least one nucleator comprising 1,2-cyclohexane dicarboxylic acid, calcium salt (1:1), (1R, 2S)-rel-; and
at least one catalyst acid scavenger;
wherein said nucleated polypropylene resin formed from a polypropylene base resin at greater than 99 weight %;
said at least one nucleator at less than 0.25 weight %; and
said at least one catalyst acid scavenger at less than 0.1 weight %, and
a contact lens contained in said package.

2. The combination of claim 1 wherein the homopolymer is 1-propene homopolymer.

3. The combination of claim 1 wherein the scavenger is a magnesium hydroxide carbonate hydrate.

4. The combination of claim 1 wherein said scavenger is present in an amount of about 0.04 weight %.

5. The combination of claim 1 wherein the nucleating agent is present in an amount of about 0.04 weight %.

6. The combination of claim 1 further containing a primary antioxidant is present in an amount of about 0.05 weight %.

7. The combination of claim 6 further containing a secondary antioxidant is present in an amount of about 0.10 weight %.

8. The combination of claim 1 wherein the homopolymer is present in an amount greater than 99 weight %.

* * * * *

UNITED STATES PATENT AND TRADEMARK OFFICE
CERTIFICATE OF CORRECTION

| | | |
|---|---|---|
| PATENT NO. | : 11,992,101 B2 | Page 1 of 1 |
| APPLICATION NO. | : 16/944204 | |
| DATED | : May 28, 2024 | |
| INVENTOR(S) | : Grishchenko et al. | |

It is certified that error appears in the above-identified patent and that said Letters Patent is hereby corrected as shown below:

On the Title Page

Item (12) should read: Grishchenko

Item (72) Inventor's name should read: Grishchenko

Signed and Sealed this
Twenty-third Day of July, 2024

Katherine Kelly Vidal
*Director of the United States Patent and Trademark Office*